United States Patent
Paranjpe et al.

(10) Patent No.: US 8,244,538 B2
(45) Date of Patent: Aug. 14, 2012

(54) MEASURING DOUBLE TALK PERFORMANCE

(75) Inventors: Shreyas Paranjpe, Vancouver (CA); Mark Fallat, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 777 days.

(21) Appl. No.: 12/432,337

(22) Filed: Apr. 29, 2009

(65) Prior Publication Data

US 2009/0276220 A1 Nov. 5, 2009

Related U.S. Application Data

(60) Provisional application No. 61/049,270, filed on Apr. 30, 2008.

(51) Int. Cl.
- G10L 11/00 (2006.01)
- G10L 21/00 (2006.01)
- G10L 19/14 (2006.01)
- G10L 21/02 (2006.01)
- H04R 29/00 (2006.01)
- H04M 1/24 (2006.01)
- G01D 3/00 (2006.01)

(52) U.S. Cl. ........ 704/270; 704/201; 704/211; 704/226; 381/58; 379/1.01; 702/108

(58) Field of Classification Search .......... None
See application file for complete search history.

(56) References Cited

U.S. PATENT DOCUMENTS

| | | | |
|---|---|---|---|
| 6,275,797 B1 * | 8/2001 | Randic | 704/233 |
| 6,700,953 B1 * | 3/2004 | Maurer et al. | 379/88.01 |
| 7,092,880 B2 * | 8/2006 | Ivanic et al. | 704/231 |
| 7,143,031 B1 * | 11/2006 | Ahroon | 704/224 |
| 8,050,918 B2 * | 11/2011 | Ghasemi et al. | 704/244 |
| 2004/0059572 A1 | 3/2004 | Ivanic et al. | |
| 2008/0177534 A1 * | 7/2008 | Wang et al. | 704/211 |

FOREIGN PATENT DOCUMENTS

EP 1 883 213 A1 1/2008
WO WO 2007/035140 A1 3/2007

OTHER PUBLICATIONS

Liu et al., "An assessment of automatic speech recognition as speech intelligibility estimation in the context of additive noise", In INTERSPEECH-2006, Sep. 17-21, 20006.*
Liu, W.M.; Jellyman, K.A.; Mason, J.S.D.; Evans, N.W.D.; , "Assessment of Objective Quality Measures for Speech Intelligibility Estimation," Acoustics, Speech and Signal Processing, 2006. ICASSP 2006 Proceedings. 2006 IEEE International Conference on , vol. 1, No., pp. I, May 14-19, 2006.*

(Continued)

*Primary Examiner* — Brian Albertalli
(74) *Attorney, Agent, or Firm* — Brinks Hofer Gilson & Lione

(57) ABSTRACT

A system evaluates a hands free communication system. The system automatically selects a consonant-vowel-consonant (CVC), vowel-consonant-vowel (VCV), or other combination of sounds from an intelligent database. The selection is transmitted with another communication stream that temporally overlaps the selection. The quality of the communication system is evaluated through an automatic speech recognition engine. The evaluation occurs at a location remote from the transmitted selection.

20 Claims, 11 Drawing Sheets

OTHER PUBLICATIONS

Wiklund, K.; Lindstrom, F.; Claesson, I.; , "Evaluation of a hands-free unit during double-talk," Consumer Electronics, 2006. ICCE '06. 2006 Digest of Technical Papers. International Conference on , vol., No., pp. 7-8, Jan. 7-11, 2006.*

Wenyu Jiang; Schulzrinne, H.; , "Speech recognition performance as an effective perceived quality predictor," Quality of Service, 2002. Tenth IEEE International Workshop on , vol., No., pp. 269-275, 2002.*

W.T. Hicks, B.Y. Smolenski, and R.E. Yantorno, "Testing the Intelligibility of Corrupted Speech with an Automated Speech Recognition System," 7th World Multiconference on Systemics, Cybernetics and Informatics, 2003.*

* cited by examiner

MEASURING DOUBLE TALK PERFORMANCE

PRIORITY CLAIM

This application claims the benefit of priority from U.S. Provisional Application No. 61/049,270, filed Apr. 30, 2008, which is incorporated herein by reference.

BACKGROUND OF THE INVENTION

1. Technical Field

This disclosure relates to evaluating communication systems, and more particularly, to systems that evaluate hands free communication systems.

2. Related Art

Some evaluation methods do not consider subjective quality. These evaluations may rate hands free systems as deficient, even though the systems may achieve subjectively good perceived quality.

Conversely, hands free systems that obtain high ratings on certain objective measures may not provide a high perceptible quality. Because objective measures may not necessarily correspond to subjective quality, it may be best for listeners to evaluate systems subjectively by listening to actual speech signals.

Some double talk measures use artificial speech signals to model real speech. The artificial speech may simulate conversations that include double talk. Hands free system features, such as switching characteristics, may be evaluated by measuring switching times or variations in attenuation levels. Slow switching times or large variations in attenuation level may lead to "temporally clipped" output. The initial or final consonants of these sound segments may not be transmitted. Some evaluations that measure switching times and attenuation ranges, may not measure the subjective perceptual quality of these systems.

SUMMARY

A system evaluates a hands free communication system. The system automatically selects a consonant-vowel-consonant (CVC), vowel-consonant-vowel (VCV), or other combination of sounds from an intelligent database. The selection is transmitted with another communication stream that temporally overlaps the selection. The quality of the communication system is evaluated through an automatic speech recognition engine. The evaluation occurs at a location remote from the transmitted selection.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The goal of many hands free communication systems is to allow users to experience transparent communication. A high quality system may support intelligible and comprehensible conversation that requires little effort to hear and understand speech, and allows participants to interact easily. A feature that facilitates interaction and may affect a user's subjective assessment is a hands free system's "duplex capability." A fully duplex system may allow participants to interact with each other. It allows parties to talk and/or hear the other sides' speech and/or noise without noticeable attenuation. "Double talk" may occur when parties speak simultaneously. A highly interactive hands free system ensures that the transmitted speech has few audible gaps, missing or incomplete phonemes, syllables, or words.

When evaluating a hands free communication system as part of a developmental process or a selection between competing systems, for example, it may be important to have a reliable, repeatable, and relevant system that may determine a system's subjective perceptual and non-perceptual quality. To reduce testing and evaluation costs, some systems may be automated and require minimal or no human intervention.

Figure 1:
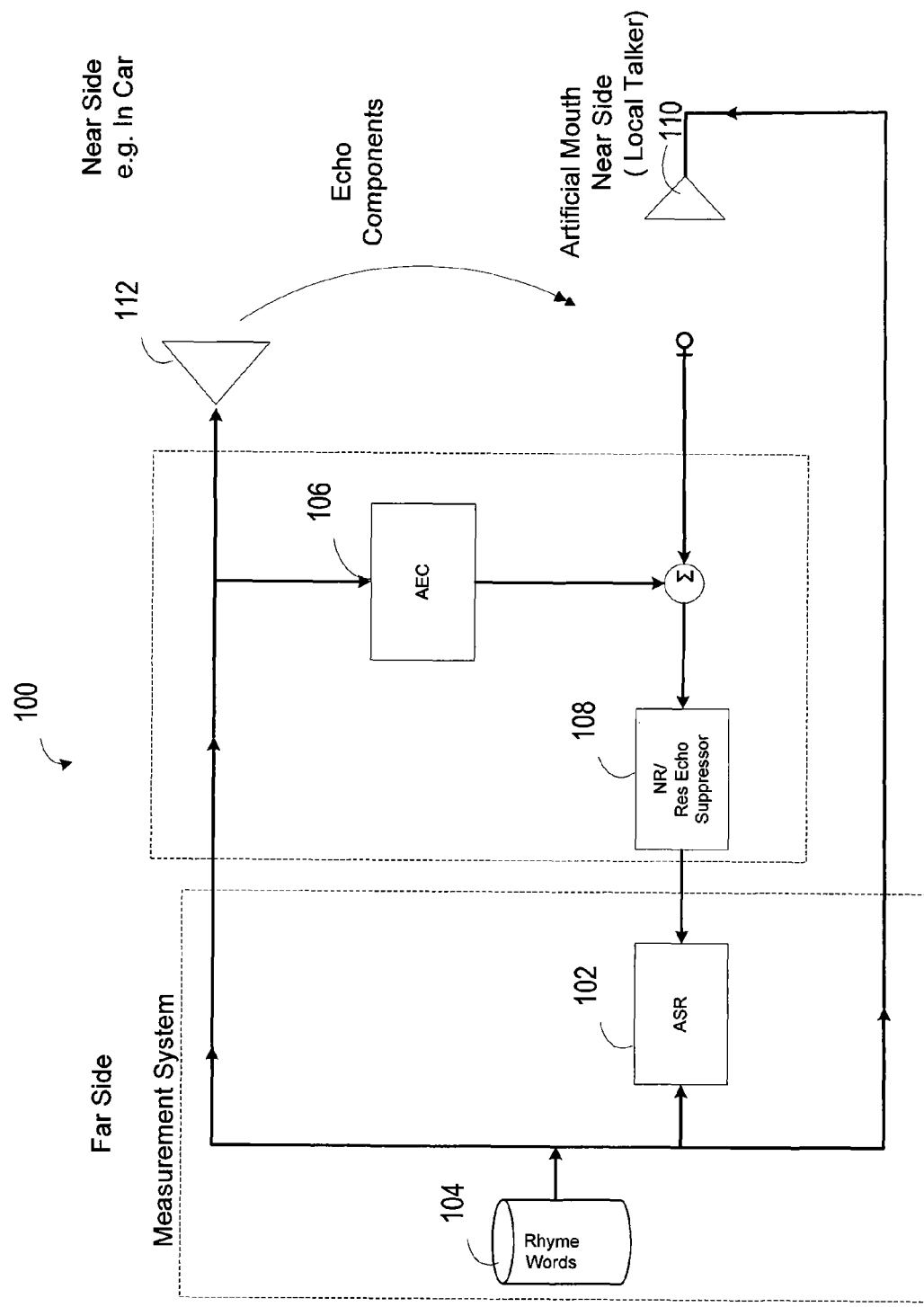
FIG. 1 is a hands free communication evaluation system.

FIG. 1 is a system 100 that may account for evaluating subjectively perceived quality in a repeatable and automated manner through an Automatic Speech Recognition (ASR) device (or engine) 102. The ASR device 102 may (receive or) listen to and evaluate transmitted signals that may be accessed from a remote or distributed memory (e.g., such as a database 104 or a local or distributed database management system). The ASR device 102 may function as a proxy for a human listener. It may improve measurements that more closely evaluate the subjective perceived quality of a hands free or wireless communication system. The systems may include an acoustic echo cancellation controller 106, and separate or unitary noise reduction suppressors and/or residual echo suppressors 108.

Figure 2:
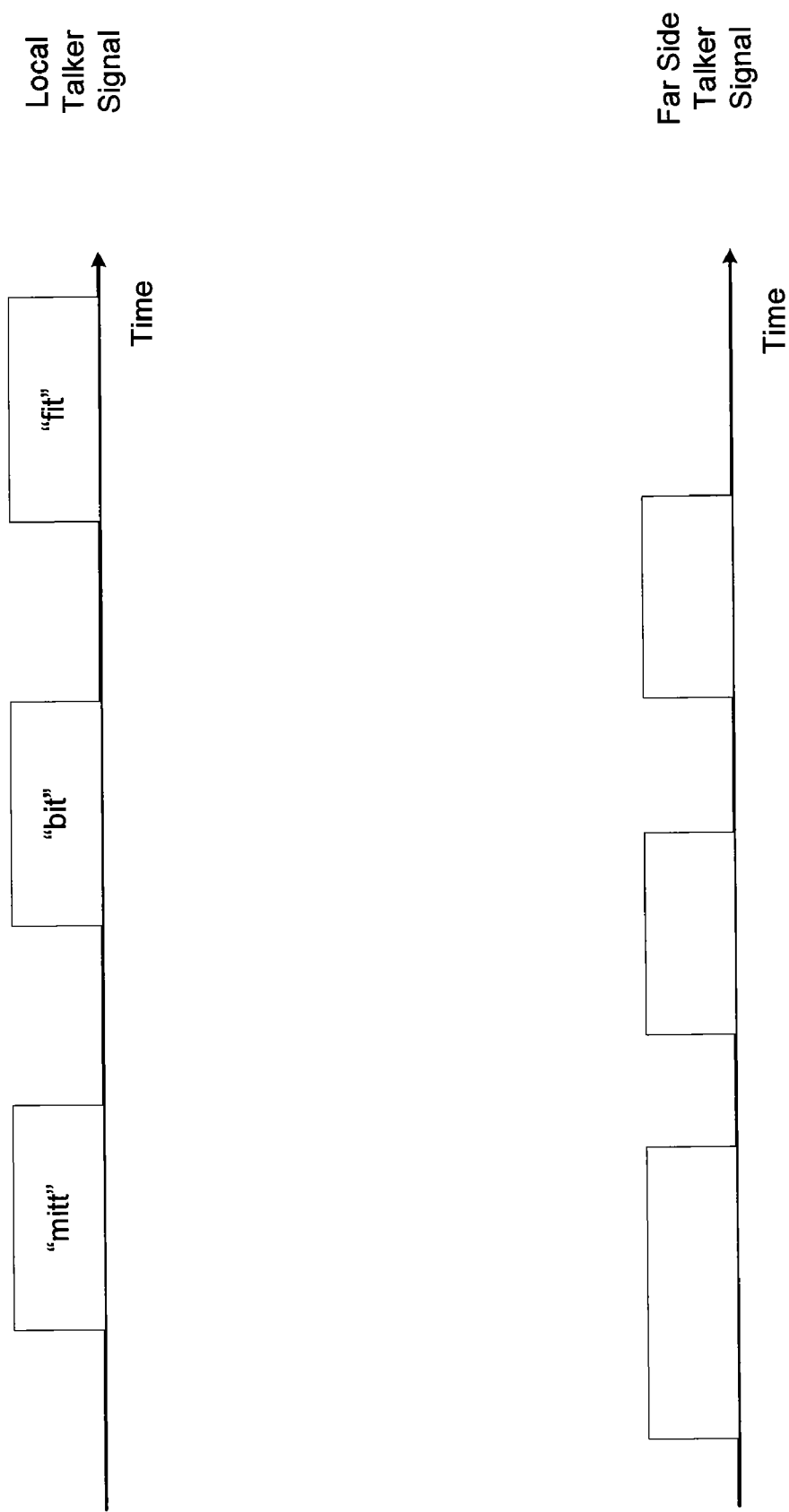
FIG. 2 is an exemplary double talk evaluation word flow.

FIG. 2 shows an exemplary double talk test word flows. The test may analyze a hands free system and evaluate whether a local talker's speech may be transmitted without any noticeable attenuation. The local talker's speech signal may comprise words from a diagnostic rhyme test (DRT) and/or diagnostic alliteration test (DALT) that may be retained in a local or remote intelligent database. The DRT/DALT words may comprise recorded or synthesized monosyllabic (English) words that may include consonant-vowel-consonant sound combinations, such as "mitt", "bit", "hit", and "fit".

As the stream of DRT/DALT words are articulated or transmitted through a local talker's near side through one or more devices that convert electric signals into audible sound 110, another stream of partially (or temporally) overlapping words may be articulated or transmitted through the far side talker's channel through a separate device or group of devices that convert electric signals to audible sound 112. A loudspeaker signal (which may comprise the far side talker's speech) may include an echo component that may be substantially attenuated or dampened later by the system or process such that it does not perceptually affect the local talker's speech.

During segments when only the far side talker's speech is active, the transmitted signal may be substantially attenuated or dampened because only an echo may be present. However, when the local talker's speech is active and temporally overlaps the far side talker's speech (e.g., a double talk event) the hands free system may transmit the local talker's near side speech. The local talker's near side speech may be clear and intelligible to the far side person. In some applications, the speech may not be substantially attenuated and may not have any noticeably missing components.

In some evaluations, some low quality hands free system react slowly and attenuate the initial consonant of each word, which might then be recognized by the ASR device 102 as "it" "it" "it" "it." On the other hand, some high quality systems may transmit the signal such that it is correctly recognized as "mitt," "bit," "hit," and/or "fit."

Figure 3:
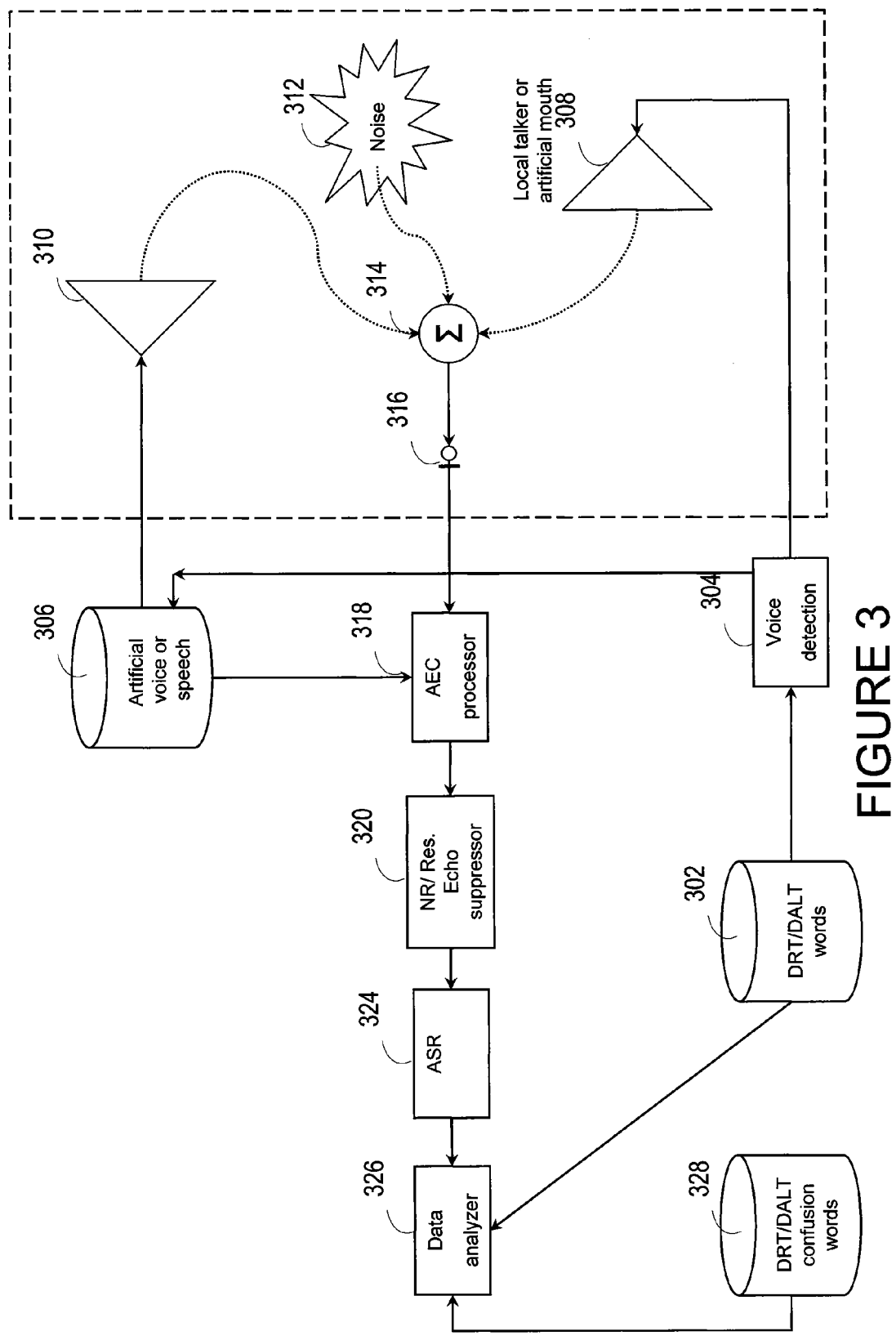
FIG. 3 is an alternative hands free communication evaluation system.

FIG. 3 is an alternative evaluation system that may evaluate the intelligibility (and in some systems comprehensibility). Intelligibility may refer to the ability to detect individual speech. Comprehensibility may refer to the ability to understand speech. To evaluate the perceptual aspect of speech intelligibility, a database server or database management system 302 may execute database tasks by selecting monosyllable word pairs that may comprise a diagnostic rhyme test (DRT) and/or diagnostic alliteration test (DALT). The word pairs may differ in their initial or their final consonants, and in some exemplary systems comprise 96 rhyming and 96 non-rhyming monosyllable word pairs. The word selections may be refined by the word pair attributes that may include or represent voicing (e.g., veal-feel), nasality (e.g., need-deed), sustentation (e.g., vee-bee), sibilation (e.g., cheap-keep), graveness (e.g., weed-reed), and compactness (e.g., yen-wren), for example. The selections may be retained in a distributed database management system in which the component partition are distributed over various nodes (or stations) of the network that retains data that represent the physical and tangible frequencies that represent speech. In an alternative system, the component partitions (e.g., a logically distinct portion of memory or a storage device that functions as though it were a physically separate unit) or memory and memory allocations may be retained at a common node (or station). The distributed database architecture may be customized to reflect the specific updates and retrieval traffic of the evaluation system.

Figure 6:
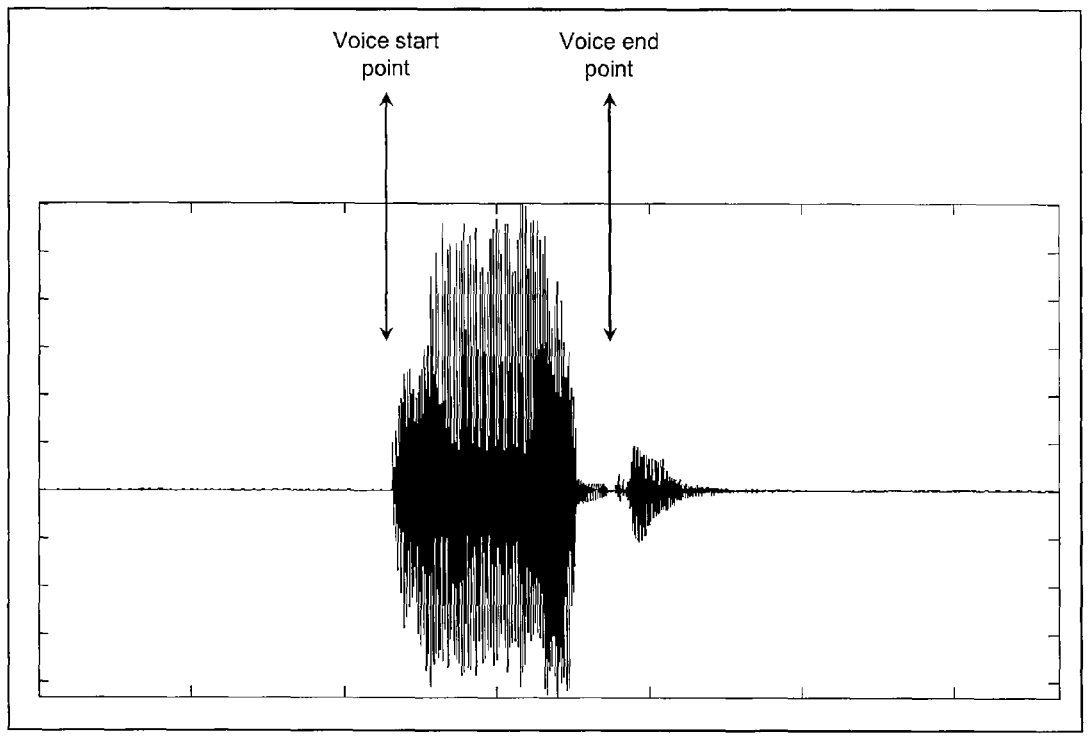
FIG. 6 is exemplary voice activity detection.

A speech detector or voice activity detector 304 may determine or measure when a frame of a captured or stored signal retained in an audio database server or audio database management system 306 representing a voiced and/or unvoiced artificial voice or speech segment may be transmitted. The speech detector or voice activity detector 304 may include a speech recognizer controller that detects and identifies the endpoints of a word selection such as a DRT/DALT (e.g., DRT and/or DLT) selection (e.g., shown in FIG. 6).

Figure 5:
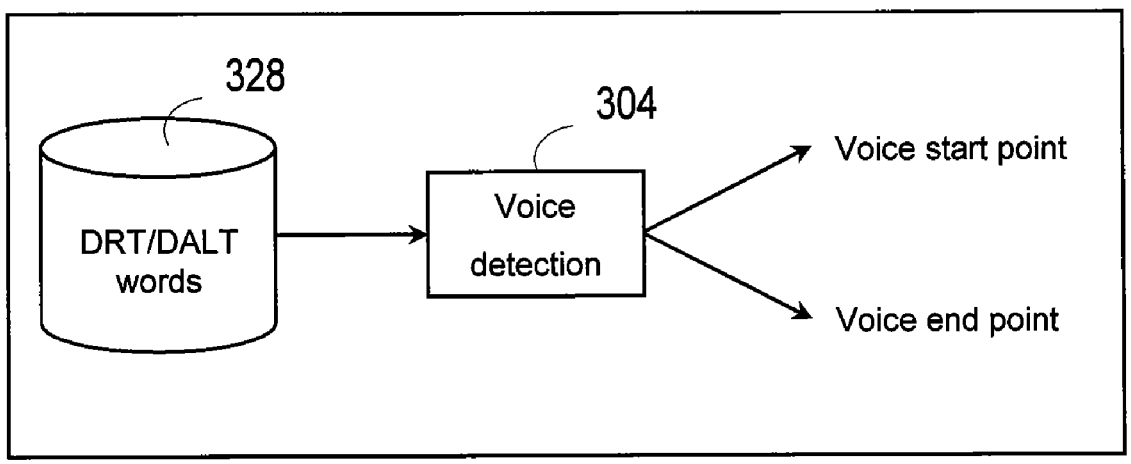
FIG. 5 is a voice activity detector in communication with a database management system.

In some systems an energy level detector may measure the endpoints of the selected word pair segment to synchronize the audible transmission of the selected word with the transmission of the selection of an artificial voice segment selected or transmitted from the audio database server or audio database management system 306. The endpoints of a DRT/DALT selection may be identified through a speech threshold comparator or comparison that may be part of, or separate from, the voice activity detector 304 shown in FIG. 5. In some systems, speech may be identified when it exceeds a threshold (e.g., some multiple of a mean or standard deviation of the mean of a measured or established noise level). When the signal falls within a predetermined fraction of the threshold, it may be classified as noise. In alternative systems, the speech endpoints may be identified through the systems and/or methods described in U.S. Ser. No. 11/152,922, filed Jun. 15, 2005 entitled "Speech-End Pointer," and/or U.S. Ser. No. 11/804,633, filed May 18, 2007 entitled "Speech-End Pointer," which are incorporated by reference.

The sound selected or transmitted by the audio database server or audio database management system 306 may comprise a generated combination of words. The output may comprise a digitized sample of recorded male and/or female speech, may comprise a combination of words formed from a digitized vocabulary, may comprise a synthesis of words from a table of phonemes (retained in a memory or database), or may comprise outputs or combination of outputs of these or separate systems. The output may emulate a near-side speech, which in a vehicle may comprise the speech of the driver or a passenger.

Figure 7:
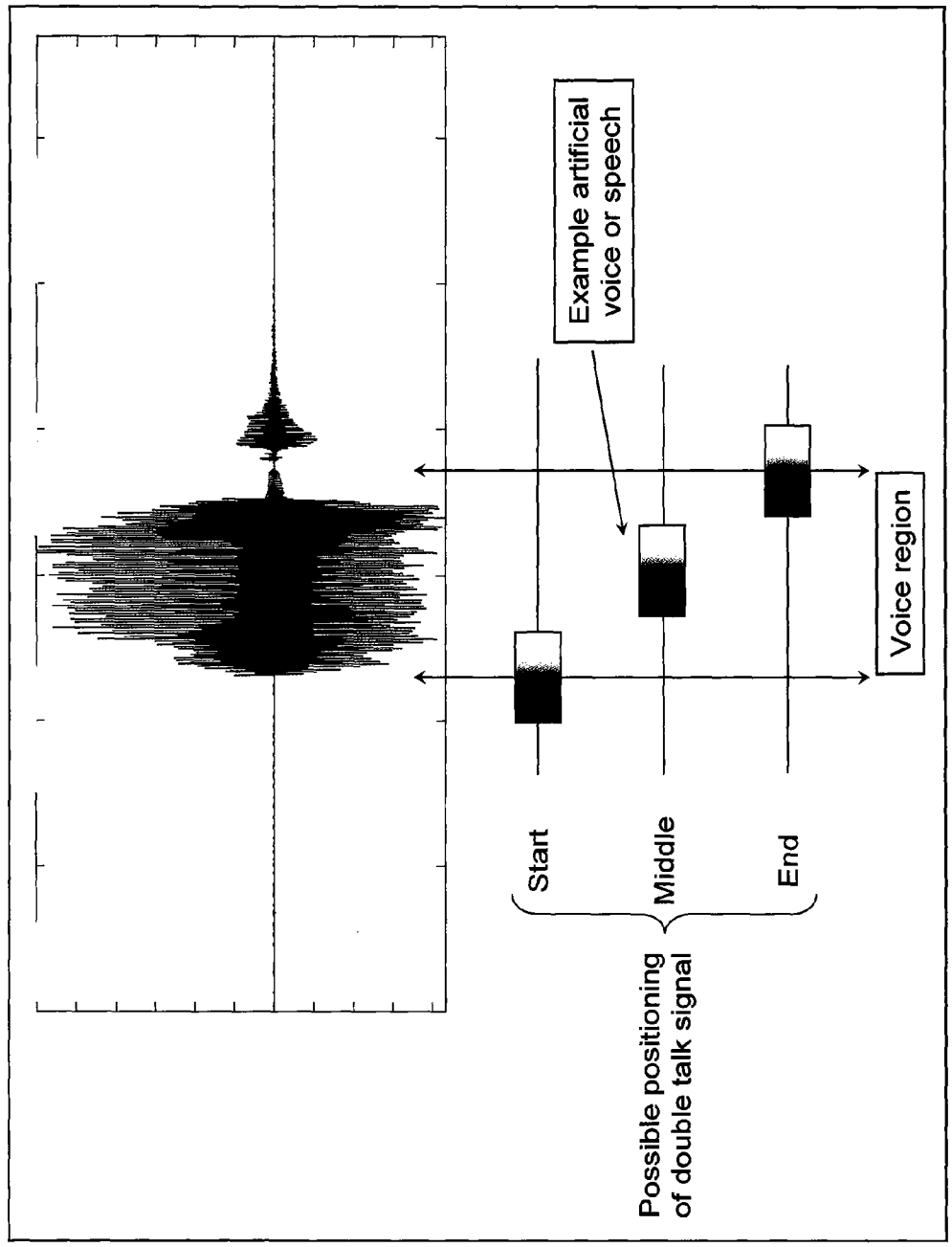
FIG. 7 is a visual positioning of a speech segment to generate a double talk occurrence.

With the endpoints of the DRT/DALT selections identified, loudspeakers or devices (308 and 310) that convert electric signals to audible (e.g., physical) sound transmit the artificial voice or speech and DRT/DALT selections (in response to a synchronizer within or in communication with the speech detector or voice activity detector 304) into an enclosure that may emulate an interior of a vehicle or a stationary interior like a conference room. The synchronizer may interface the server or database management system 302 to compensate for differences between transmission rates between the audio database server or audio database management system 306 and the server or database management system 302. Based on the programming of the audio database server or audio database management system 306 or synchronizer, the artificial voice or speech may be transmitted at substantially the beginning, middle, or end of the DRT/DALT selections as shown in FIG. 7. A wideband or narrowband noise synthesizer 312 shown in FIG. 3 may generate and transmit periodic and/or non-periodic noise or other external signals that may affect a communication environment. The signals may distort or result in a loss of information within the enclosure. The interference may vary, and in some systems, may emulate the noise that may be heard or expected to be heard within a vehicle, conference room, or other open or closed enclosures.

An optional input mixing device 314 may receive and mix the audio (including the noise). The combined speech, echo, noise, etc. may be filtered or limited to a perceptible frequency range (e.g., from about 15 through 20,000 hertz). The input may be converted into electrical signals by an input device such as a microphone. The converted data or composite data may be further processed by optional hardware that output digital data or may be acquired (unconverted) and processed by a processor or a digital signal processor. Optional noise suppression such as an acoustic echo cancellation device or canceller 318, a noise reduction filter and/or residual echo suppression device 320 may selectively pass certain elements of the signal while eliminating or minimizing others elements. Exemplary optional noise suppressions systems may include U.S. Ser. No. 10/410,736, filed Apr. 10, 2003 entitled "Wind Noise Suppression System," U.S. Ser. No. 11/006,935, filed Dec. 8, 2004 entitled "System For Suppressing Rain Noise," U.S. Ser. No. 11/607,340, filed Nov. 30, 2006 entitled "Signature Noise Removal," U.S. Ser. No. 11/771,258, filed Jun. 29, 2007 entitled "Fast Acoustic Cancellation," U.S. Ser. No. 11/923,358, Filed Oct. 24, 2007 entitled "Dynamic Noise Reduction," U.S. Ser. No. 11/804,577, filed May 17, 2007 entitled "Adaptive LPC Noise Reduction System," and U.S. Ser. No. 12/023,381, filed Jan. 31, 2008 entitled "Adaptive Noise Modeling Speech Recognition System," each of which are incorporated herein by reference.

Figure 8:
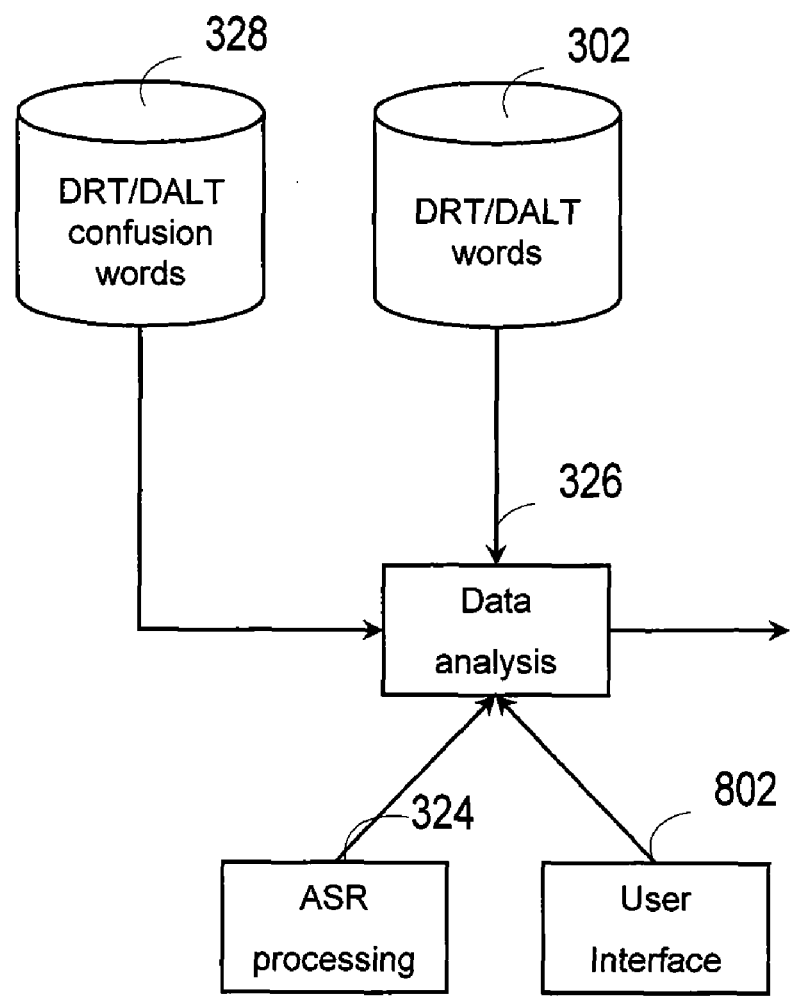
FIG. 8 is a data analysis controller interfacing exemplary database machines, and automatic speech recognition engine and an interface.

An ASR engine 324 may (receive or) listen, evaluate, and recognize the transmitted signals that may be processed in real-time or accessed from a remote or distributed memory or database machine. The output of the ASR engine 102 may be transmitted through a publicly accessible distributed network (such as the Internet or privately accessible distributed network) to a local or remote data analysis controller 326 that may communicate with a subset of the data or records retained in the database management system 302 (shown as a separate data management system 328) that comprises records or data of confusion words that may not be commonly identified or comprehended by some ASR engines. The local or remote data analysis controller 326 may include a user interface that allows users to enter data or confirm ASR engine selections (as shown in FIG. 8). The statistical analysis may render percentage of correct identifications, a measure of standard deviation, a comparison of male and/or female speakers, statistics about word attributes, and other statistical analysis.

To replicate human results, some exemplary ASR engines 304 employ a restrictive grammar set that allows the ASR engines 304 to select one of many (e.g., two words) in the word choices for a given word. The output of the ASR engines 304 may be processed by the local or remote data analysis controller 326 to measure the level of intelligibility based on correct selections.

Some ASR engines 304 may determine if possible confusions exist after processing. In these systems the ASR engine 304 may re-process the data by processing a less restrictive grammar set that may include more common confusion words. For example, if given processed versions of the words "mitt", "bit", "fit" and "hit" a possible confusion word to be added to the grammar may comprise de-concatenated word selections such as the word "it," for this example. The de-concatenations may occur automatically through the ASR engine 304 or may be added through a user interface in communication with the ASR engine 304. By this addition, the system may automatically provide an additional layer of evaluation to a hands free system.

Figure 9:
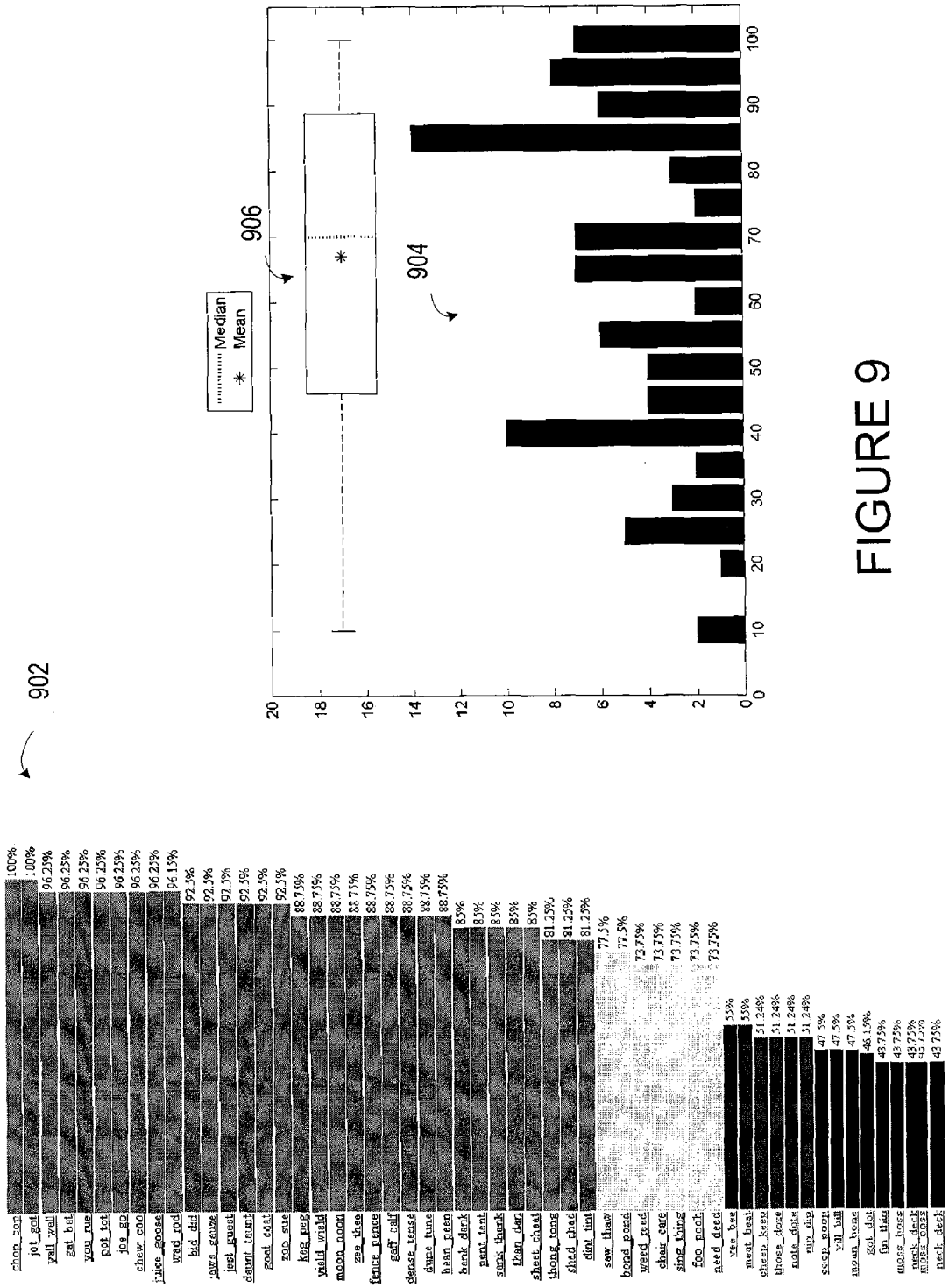
FIG. 9 is an exemplary visual output of an automatic speech recognition engine.

In some systems the local or remote data analysis controller 326 may be organized as an event-driven server, a process driven server, or hybrid server. In an event-driven architecture, the data analysis controller 326 may accept a client request and render the visual graphic that displays the output of the analysis. As an extension of handling a single requests, the data analysis controller 326 may alternate by servicing different requests like the visual graphic of word-pairs and associated identification rates (or percentages) and a second request serving a histogram or distribution of all of the results of the recognized words pairs shown as a histogram 904 and a box-plot of a mean and medium 906 shown in FIG. 9 to a remote client. In a process-driven architecture, the data analysis controller 326 or server may devote a separate process to each request. In this configuration, each process executed by the server performs all of the steps to handle a request. In this configuration, the data analysis controller 326 may run multiple processes that enable it to serve multiple requests. In an alternative hybrid configuration, each process may emulate an event driven server that alternates between small collections of requests.

Figure 4:
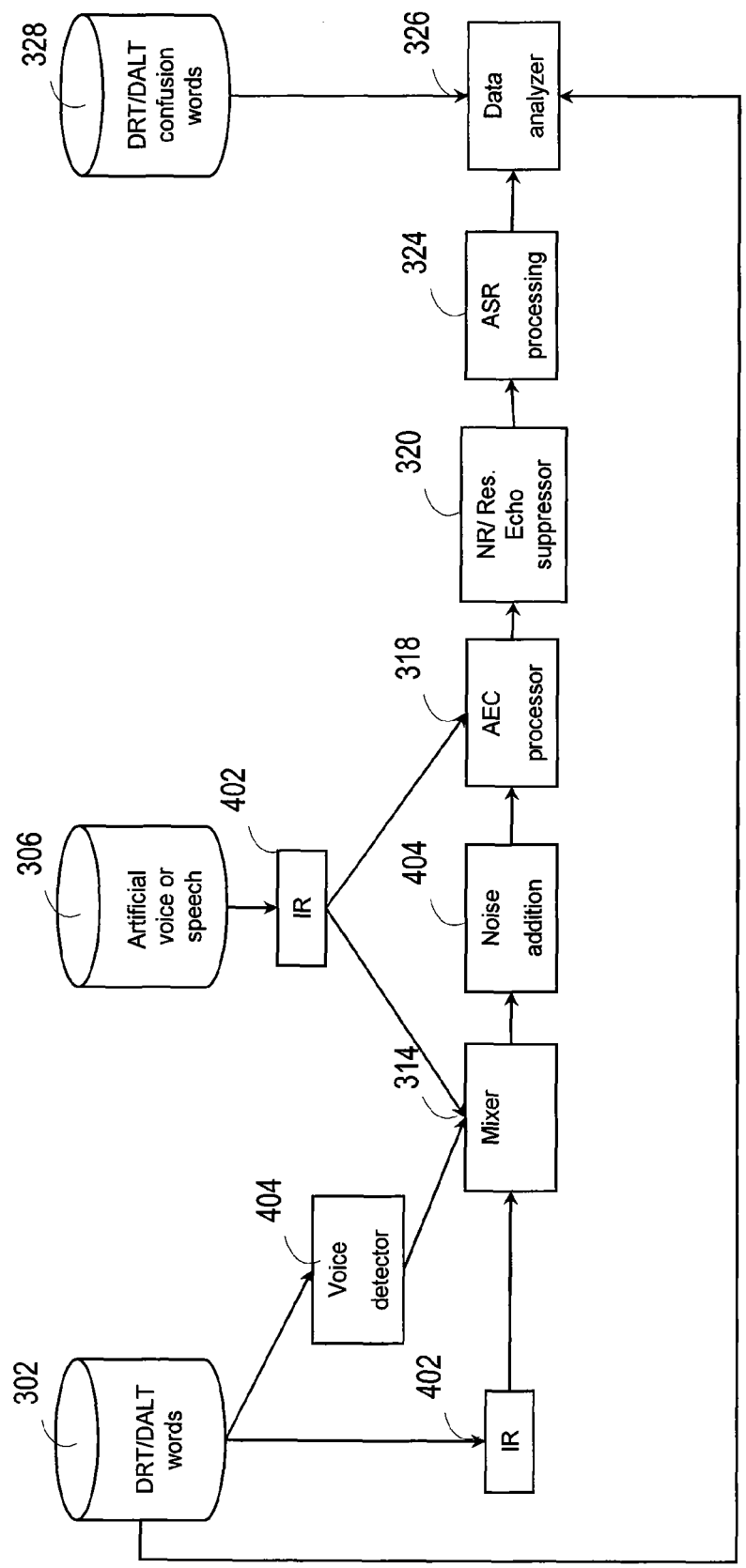
FIG. 4 is an alternative hands free communication evaluation system.

FIG. 4 shows another alternative evaluation system that may evaluate the intelligibility (and in some systems comprehensibility) of a hands-free communication system. In FIG. 4, convolvers 402 process the output of the database management system 302 and the audio database server or audio database management system 306, respectively. The convolvers map the respective input signals to reflect the frequencies of an impulse response. In some systems, the impulse response output may represent how sound may react within an enclosure. The physical and tangible affects represented by the data may represent environments like an interior of a vehicle or conference room. In FIG. 4 wideband or narrow-band noise synthesizer 404 blends the mixer (314) output before the output is possessed by the devices and components described in FIG. 3. In alternative systems, the output of the noise synthesizer 404 may comprise an input to the mixing device 314.

The methods and descriptions of FIGS. 1, 2, and 4 may be encoded in a signal bearing medium, a computer readable medium such as a memory that may comprise unitary or separate logic, programmed within a device such as one or more integrated circuits, or processed by a controller, a computer, or an automated speech recognition system. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory. The memory may retain an ordered listing of executable instructions for implementing logical functions.

A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hard-wired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

An automatic speech recognition machine may evaluate a hands free transmitted signal by measuring perceptually relevant parameters that relate more directly to a listener's subjective perceived quality. The predetermined selection of words and/or sound combinations for recognition may capture this measure. The word and/or combinations may be selected from various intelligibility tests including the Diagnostic Rhyme Test, Diagnostic Alliteration Test, Diagnostic Medial Consonant Test, and Modified Rhyme Test, for example, and/or comprehension tests. The evaluation may allow for double talk testing across the initial, middle, and final consonants of the transmitted words or sound combinations.

In some systems the temporal occurrence of a selected word or combination may be based on the output of a voice activity detector 304. While the voice activity detector of FIGS. 4 and 5 may monitor words selected from various intelligibility databases in alternative systems, the synchronous transmission and position of a selected word or word combinations (e.g., through the synchronizer) may be based on the detection of the length of the a voiced and/or unvoiced artificial voice or speech segment accessed through audio database server or audio database management system 306. In this system, and in alternatives to each of the systems described above, the artificial voice or speech segment may comprise one, two, three, or more recorded speech samples from male and/or female speakers.

In each of the described systems, a measure of comprehensibility may also be derived. In some applications comprehensibility may be based on a percentage of correct identifications. It may be based on the percentages shown in FIG. 9. When shown visually, the visual graphics (e.g., 902) may be color coded to render impression characteristics. Green may indicate a highly acceptable identification (e.g., a range between about 80%-about 100%), yellow may indicate a less acceptable identification (e.g., a range between about 70% to about 79%); red may indicate an unacceptable identification (e.g., a range between about 50% to about 69%).; and black may indicate a failed identification (e.g., a range between about 0% to about 49%). In some systems, some or all of the impression characteristics or other word symbol, or image may be associated with a hyperlink. A hyperlink may be activated through an absolute or relative pointing device. Selection and activation or a hyperlink may act as a navigation element to another section of the display or another document that may render more or different detail.

Figure 10:
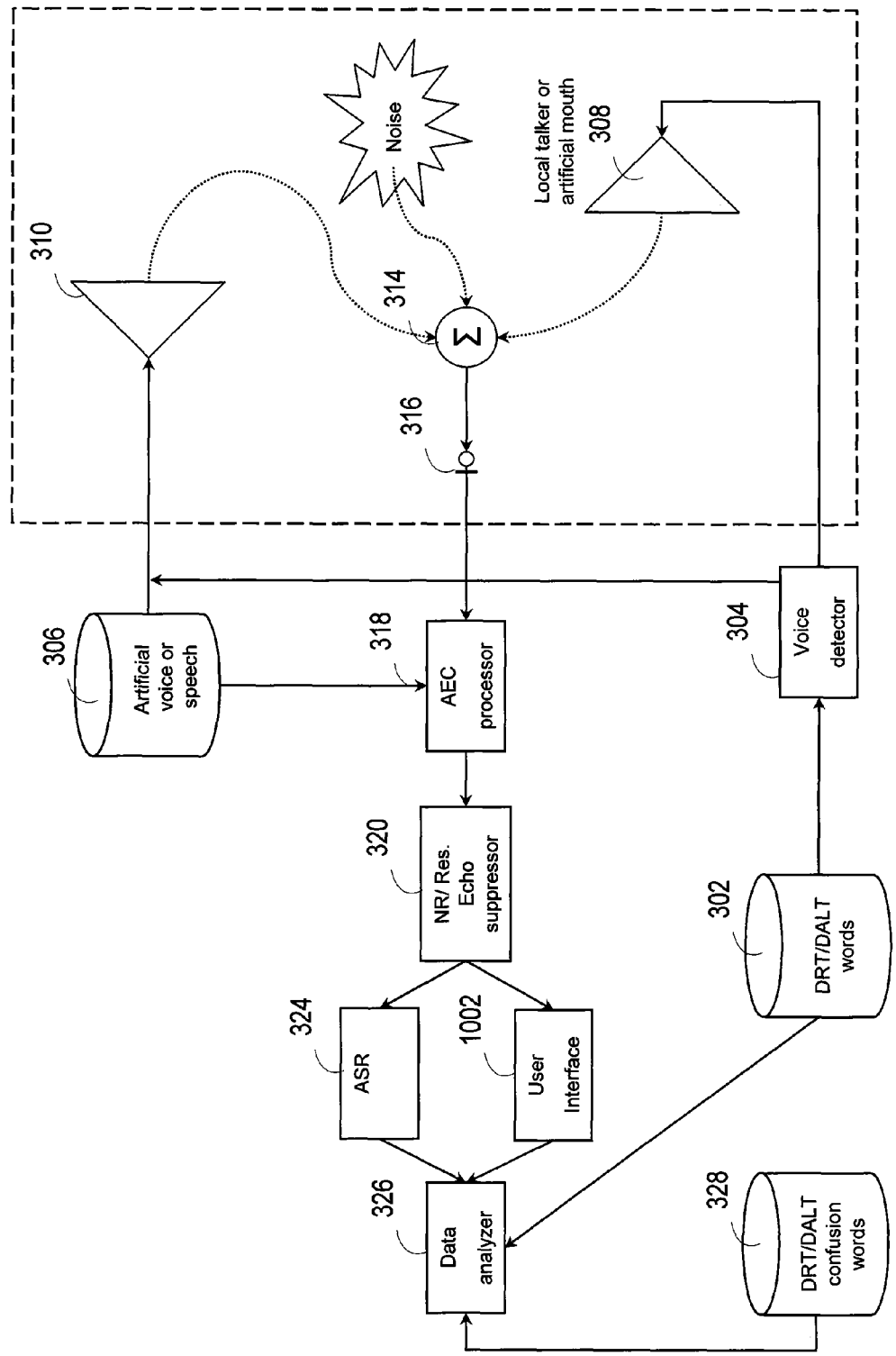
FIG. 10 is an alternative hands free communication evaluation system.
Figure 11:
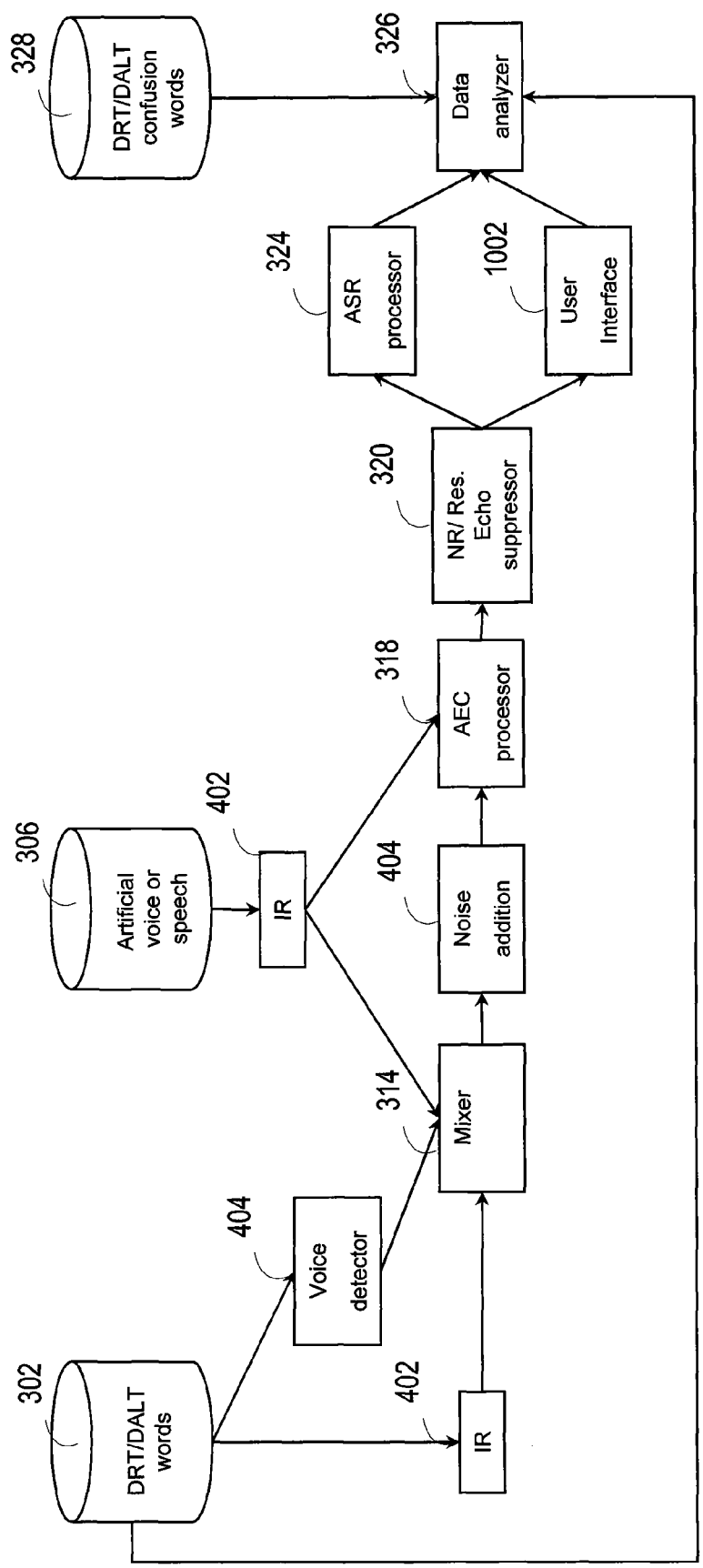
FIG. 11 is an alternative hands free communication evaluation system.

FIGS. 10 and 11 show other alternative systems. In these systems, evaluations may be supplemented through an interface device 1002 or node. The interface device may support an environment that renders programs, files, and options through icons, menus, and dialog boxes on a local or remote screen (e.g., a graphical user interface). A user may select and activate these options through a relative or absolute pointing device, keyboard selection, or voice recognition detector. The interface may include software routines to handle these elements and report the user's actions (such as a mouse click on a word selection or pointing or highlighting a particular location in text, or a key press, for example). Many applications may call these routines with specific parameters.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of evaluating a hands free communication system, comprising:
   selecting a consonant-vowel-consonant combination of sounds from an intelligent database automatically;
   transmitting the selection when an other communication stream that temporally overlaps the selection is transmitted automatically; and
   evaluating the quality of the communication system through an automatic speech recognition engine by measuring the number of correctly recognized words from the selected stream when it is received at a location remote from the transmitted selection.

2. The method of evaluating a hands free communication system of claim 1 where the selection is based on voicing, nasality, sustentation, graveness, or a compactness attribute.

3. The method of evaluating a hands free communication system of claim 1 where the selection is based on voicing, nasality, sustentation, graveness, and a compactness attribute.

4. The method of evaluating a hands free communication system of claim 1 where the consonant-vowel-consonant combination comprises a monosyllable word pair.

5. The method of evaluating a hands free communication system of claim 4 where the monosyllable word pair comprises a selection from a Diagnostic Rhyme Test or a derivative of the Diagnostic Rhyme Test.

6. The method of evaluating a hands free communication system of claim 5 where the monosyllable word pair comprises a plurality of monosyllable word pair that represent voicing, nasality, sustentation, graveness, and a compactness attribute, respectively.

7. The method of evaluating a hands free communication system of claim 1 further comprising measuring a frame of the other communication stream to identify voiced and unvoiced speech segments and processing the measurement to synchronize the transmission of the consonant-vowel-consonant combination with the transmission of the other communication stream.

8. The method of evaluating a hands free communication system of claim 7 further comprising an energy level detector that measures the endpoints of the other communication stream.

9. The method of evaluating a hands free communication system of claim 1 where the other communication stream comprises an artificial voice segment.

10. The method of evaluating a hands free communication system of claim 1 where the other communication stream comprise a synthesis of words from a table of phonemes retained in a memory.

11. The method of evaluating a hands free communication system of claim 1 further comprising a plurality of conversion devices that convert electric signals representing the consonant-vowel-consonant combination and the communication stream into an audible sound.

12. The method of claim 11 further comprising mixing the consonant-vowel-consonant combination audible segment with the other communication stream audible segment with a noise generated from a wideband noise synthesizer.

13. The method of evaluating a hands free communication system of claim 1 further comprising transmitting the quality evaluation to a remote data analysis controller through a publicly accessible distributed network.

14. A system that evaluates a hands free communication system, comprising:
- a audio database management system that retains voiced and/or unvoiced artificial voice or speech segments to be transmitted through a loudspeaker;
- a voice activity detector configured to measure a frame of the voiced and/or unvoiced artificial voice or speech segment;
- a synchronizer that compensates for differences in rates of communication between the audio database management system and a separate server that accesses diagnostic word pairs;
- a narrowband noise synthesizer configured to generate and transmit periodic and/or non-periodic noise signals temporally with the output of the loudspeaker;
- a mixer that receives and mixes the output of the loudspeaker, an audible representation of the diagnostic word pairs, and an output of the narrowband noise synthesizer;
- an automatic speech recognition engine in communication with the mixer programmed to select one of the diagnostic word pairs; and
- a data analysis controller remote from the automatic speech recognition engine configured to measure the level of intelligibility of a hands free system based on an evaluation of the automatic speech recognition engine's word selections.

15. The system that evaluates a hands free communication system of claim 14 where the data analysis controller is resident to an event-driven-server.

16. The system that evaluates the hands free communication system of claim 14 where the data analysis controller is resident to a process-server.

17. The system that evaluates the hands free communication system of claim 16 where the process-server renders an impression characteristic that is transmitted to a client device.

18. The system that evaluates the hands free communication system of claim 17 further comprising a graphical user interface configured to present the diagnostic word pairs to a user and receive the selection of the two words that the user perceived to have heard.

19. The system that evaluates the hands free communication system of claim 14 further comprising a first convolver interfaced to the audio database management system and a second convolver interfaced to the server.

20. A system that evaluates a hands free communication system, comprising:
- a audio database management system that retains voiced and/or unvoiced artificial voice or speech segment to be transmitted through a loudspeaker;
- a voice activity detector configured to measure a frame of the voiced and/or unvoiced artificial voice or speech segment;
- a synchronizer that compensates for differences in rates of communication between the audio database management system and a separate server that accesses diagnostic word pairs;
- a narrowband noise synthesizer configured to generate and transmit periodic and/or non-periodic noise signals temporally with the output of the loudspeaker;
- a mixer that receives and mixes the output of the loudspeaker, an audible representation of the diagnostic word pairs, and an output of the narrowband noise synthesizer;
- an automatic speech recognition engine in communication with the mixer programmed to select one of the diagnostic word pairs; and
- means remote from the automatic speech recognition engine configured to measure the level of intelligibility of a hands free system based on an evaluation of an automatic speech recognition engine's word selections and a user's word selection received through a user interface.

* * * * *